US012512772B2

(12) United States Patent
Guo et al.

(10) Patent No.: US 12,512,772 B2
(45) Date of Patent: Dec. 30, 2025

(54) MAGNETIC LEVITATION BASED LOW-GRAVITY SYSTEM

(71) Applicant: The Florida State University Research Foundation, Inc., Tallahassee, FL (US)

(72) Inventors: Wei Guo, Tallahassee, FL (US); Hamid Sanavandi, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 468 days.

(21) Appl. No.: 18/055,682

(22) Filed: Nov. 15, 2022

(65) Prior Publication Data

US 2023/0170827 A1    Jun. 1, 2023

Related U.S. Application Data

(60) Provisional application No. 63/284,365, filed on Nov. 30, 2021.

(51) Int. Cl.
*H02N 15/00*   (2006.01)
*H01F 6/04*    (2006.01)
*H01F 6/06*    (2006.01)

(52) U.S. Cl.
CPC .............. *H02N 15/00* (2013.01); *H01F 6/04* (2013.01); *H01F 6/06* (2013.01)

(58) Field of Classification Search
CPC .. H02N 15/00; H01F 6/04; H01F 6/06; H01F 6/00; B64G 7/00
See application file for complete search history.

(56) References Cited

U.S. PATENT DOCUMENTS

| | | | | |
|---|---|---|---|---|
| 5,332,987 A | * | 7/1994 | Hennessy | H02N 15/00 310/90.5 |
| 2010/0277263 A1 | * | 11/2010 | Schnur | G01R 33/3815 335/216 |
| 2016/0111192 A1 | * | 4/2016 | Suzara | H01F 6/06 335/301 |

FOREIGN PATENT DOCUMENTS

| | | | | |
|---|---|---|---|---|
| CN | 109346262 A | * | 2/2019 | H01F 6/00 |
| CN | 113470921 A | * | 10/2021 | |
| EP | 2006559 A2 | * | 12/2008 | F16C 32/0438 |

OTHER PUBLICATIONS

International Search Report & Written Opinion for PCT/US2022/051077 mailed Mar. 21, 2023.

(Continued)

*Primary Examiner* — Mohamad A Musleh
(74) *Attorney, Agent, or Firm* — Eversheds Sutherland (US) LLP

(57) ABSTRACT

An improved magnetic-levitation-based low-gravity simulator (MLS) is provided. The MLS comprises one or more gradient-field Maxwell coils that are provided within a superconducting magnet. When a current is provided to the one or more Maxwell coils and the superconducting magnet, a simulated low-gravity region is produced within the MLS. An object may be provided within this low-gravity region and may levitate within the region. The MLS may be used to test the impacts of low-gravity environments (for example, extraterrestrial environments) on different types of objects. Compared to an existing solenoid MLS, the improved MLS described herein includes a much larger volume low-gravity region at a lower energy expenditure.

15 Claims, 12 Drawing Sheets

(56) References Cited

OTHER PUBLICATIONS

Database Medline [Online] US National Library of Medicine (NLM), Bethesda, MD, US; Oct. 29, 2021 (Oct. 29, 2021), Sanavandi Hamid et al: "A magnetic levitation based low-gravity simulator with an unprecedented large functional volume.", XP002808777, Database accession No. NLM34716356 abstract & Sanavandi Hamid et al: "A magnetic levitation based low-gravity simulator with an unprecedented large functional volume.", NPJ Microgravity Oct. 29, 2021, vol. 7, No. 1, Oct. 29, 2021 (oCT. 29, 2021), p. 40, ISSN: 2373-8065.

Chen Q. Y.: "Magnetic Levitation Using High-Temperature Superconductors: a Materials Perspective", IEEE Transactions On Instrumentation and Measurement, IEEE, USA, vol. 41, No. 6, Dec. 31, 1992 (Dec. 31, 1992), pp. 824-828, XP000358651, ISSN: 0018-9456, DOI: 10.1109/19.199416 the whole document.

Quettier L. et al.: "A magnet system design for reduced gravity environment", Cryogenics, Elsevier, Kidlington, GB, vol. 50, No. 9, Sep. 30, 2010 (Sep. 30, 2010), pp. 534-540, XP027221572, ISSN: 0011-2275 [retrieved on Mar. 6, 2010] the whole document.

Ozturk Yavuz et al: "Current Status in Building a Compact and Mobile HTS MRI Instrument", IEEE Transactions On Applied Superconductivity, IEEE, USA, vol. 31, No. 5, Mar. 23, 2021 (Mr. 23, 2021), pp. 1-5, XP011854259, ISSN: 1051-8223, DOI: 10.1109/TASC.2021.3068305 [retrieved on May 10, 2021] the whole document.

* cited by examiner

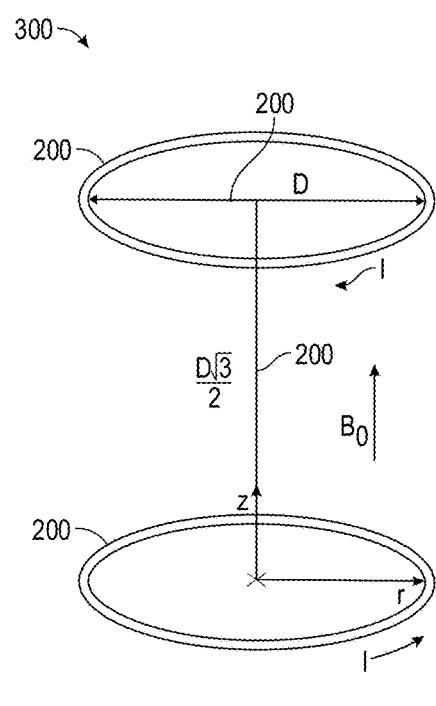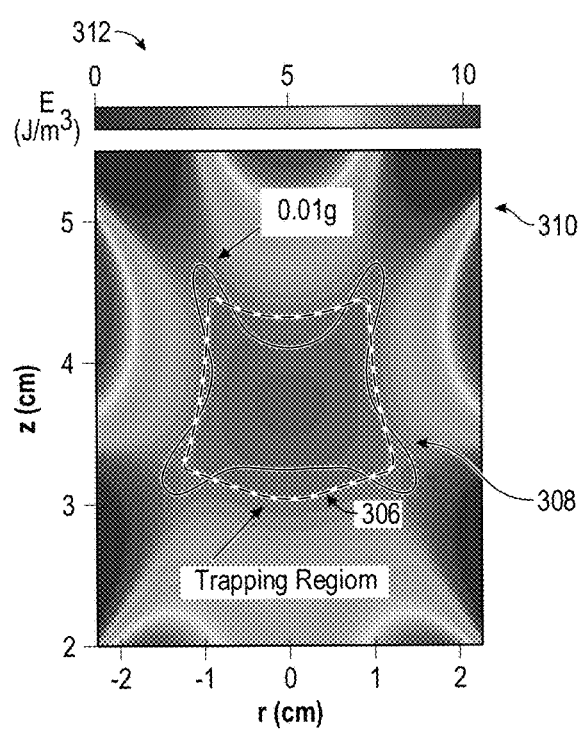
FIG. 3A
FIG. 3B

800 ⬎

┌─ 802
| Producing a volume of low gravity within a device, wherein the
| volume is greater than 4,000 microliters (μL).

FIG. 8

MAGNETIC LEVITATION BASED LOW-GRAVITY SYSTEM

STATEMENT REGARDING FEDERALLY SPONSORED RESEARCH

This invention was made with government support under grant number CBET-1801780 awarded by the National Science Foundation. The government has certain rights in the invention.

BACKGROUND

Low-gravity environments can have a profound impact on the behaviors of biological systems, the dynamics of fluids, and the growth of materials, for example. Systematic research on the effects of gravity is crucial for advancing knowledge and for the success of space missions (and for various other use cases). An ideal microgravity condition may be achieved in spaceflight experiments conducted during space-shuttle missions and at space stations. However, these experiments may be impractical given the associated costs and payload size and mass limitations. Given that the astronauts are conducting the experiments rather than trained scientists further constrains the design of the experiments. For these reasons, researchers have devoted great efforts to developing ground-based low-gravity simulators. One major category of these efforts involves using drop towers, parabolic aircraft, sounding rockets, and suborbital rocketry to produce free fall conditions to replicate near-zero gravity conditions. Despite the effectiveness of this type of approach, a known limitation is the relatively short period of time during which the low-gravity condition is present (for example, the period may range from several seconds to a few minutes), which makes this approach unsuitable for experiments that require long observation times. In biological and medical research, rotational facilities, such as clinostat machines, rotating wall vessels, and random positioning machines are also adopted to achieve a small time-averaged gravity vector. Although these simulators are convenient, they do not produce a genuine low-gravity environment and may generate unwanted centrifugal forces and circulating flows in the samples that are being tested.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIGS. 3A-3B illustrate a functional volume of an MLS design using a gradient-field Maxwell coil, in accordance with one or more embodiments of the disclosure.

FIG. 8 illustrates an example method, in accordance with one or more embodiments of this disclosure.

DETAILED DESCRIPTION

Disclosed is a magnetic-levitation-based low-gravity simulator (MLS). An MLS provides a simulated low-gravity testing environment with practically unlimited operation time. This simulated testing environment may be useful for a variety of use cases (for example, to emulate the reduced gravities in extraterrestrial environments (such as may be found on different planets)). Reduced gravity is known to have important effects on various biological and physical systems. For instance, a weightless environment may prohibit cell culture growth and may cause cellular stressors and bone loss that can negatively impact astronauts' health. In fluid systems, reduced gravity can significantly impact the dynamics of cryogenic propellants in a spacecraft, the surface oscillation of liquid drops, bubble cavitation, and boiling heat transfer in fluids. In material science, the potential of reduced gravity in growing tissues and crystals and for materials processing has been recognized. Thus, there is a need to conduct systematic research to understand the mechanism of gravity in these diverse systems.

Figure 2A:
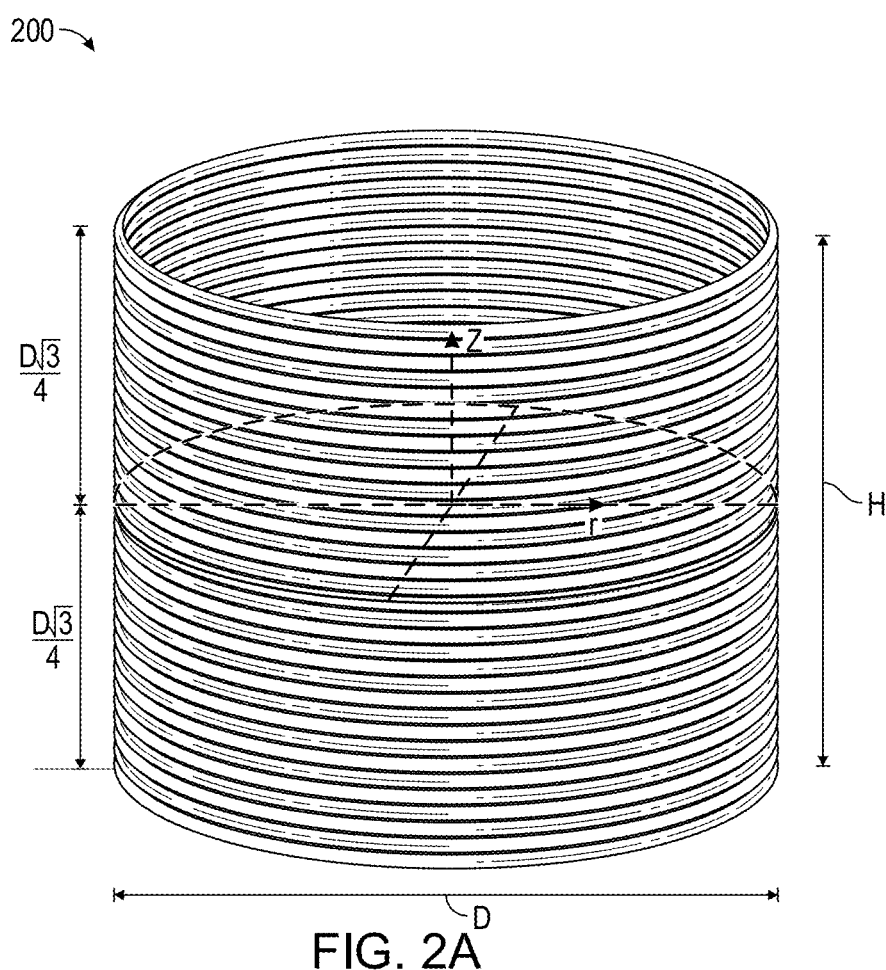
FIGS. 2A-2C illustrate a functional volume analysis for a conventional solenoid MLS, in accordance with one or more embodiments of the disclosure.
Figure 2B:
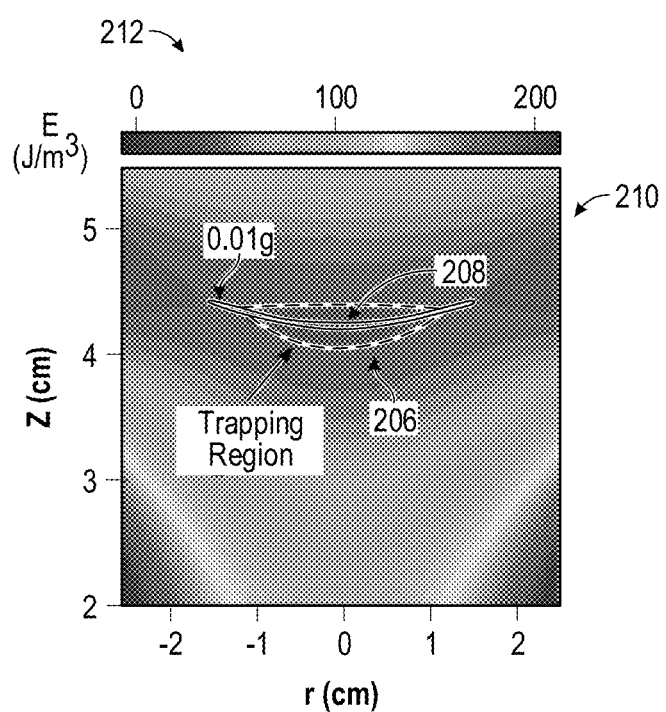

Current MLSs are typically solenoid MLSs that produce highly non-uniform magnetic fields. Compared to other low-gravity simulator systems, a magnetic levitation-based simulator (MLS) offers unique advantages, including low cost, easy accessibility, adjustable gravity, and practically unlimited operation time. However, a known issue with conventional MLSs is that they produce a highly non-uniform magnetic field around the levitation point. If a 0.01-g functional volume $V_{1\%}$ is defined, where the net force results in an acceleration less than 1% of the Earth's gravity, g, $V_{1\%}$ is typically less than a few microliters (μL) (for example, as illustrated in FIG. 2B) for these conventional solenoid MLSs. Although diamagnetic samples with sizes larger than $V_{1\%}$ can be levitated, a stress field caused by the residue force inside the samples can compromise the measurement results. Despite some limited efforts in designing MLSs for improved functional volumes, major progress is still lacking in such conventional systems. Furthermore, the high energy consumption rate of conventional resistive solenoid MLSs is also concerning. For instance, 4 MW of power may be required to levitate a frog using a resistive solenoid MLS.

In contrast with this existing solenoid MLS, the improved MLS described herein may instead integrate a superconducting magnet with a gradient-field Maxwell coil made of high-temperature rare-earth barium copper oxide (REBCO) superconducting tapes. This configuration is advantageous over the existing solenoid MLS because it includes: (1) an unprecedentedly large low-gravity functional volume, (2) practically unlimited operation time, (3) easily adjustable effective gravity, and (4) a minimal energy consumption rate.

A method is also provided that allows for the determination of the operational parameters associated with an optimal MLS configuration. Using the optimal parameters, the functional volume of the MLS, where the net force may result in an acceleration less than 1% of the Earth's gravity, may exceed three orders of magnitude greater than a conventional solenoid MLS. The improved MLS described herein may also be operated using lower currents. The derived functional volume within this MLS may be large enough to accommodate small plants and living organisms, which makes the MLS more useful than existing solenoid MLSs in the preparation for future space missions aimed at long-term habitation of extraterrestrial environments.

Figure 7A:
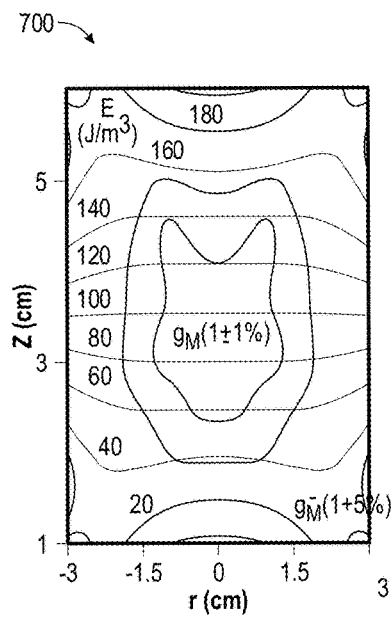
FIGS. 7A-7C illustrate plots exemplifying the performance of an MLS as a simulator, in accordance with one or more embodiments of this disclosure.
Figure 7B:
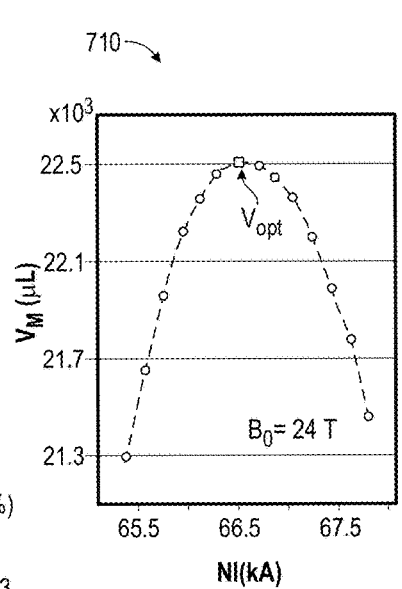
Figure 7C:
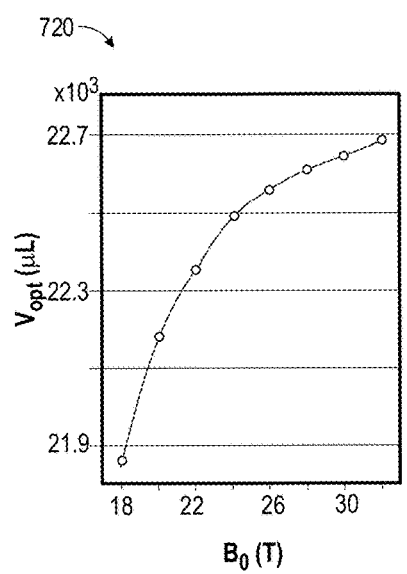

The larger low-gravity volume is produced within the MLS by providing a current to the one or more gradient-field Maxwell coils and the superconducting magnet. This causes a large magnetic field to be produced within the MLS, which simulates a low-gravity environment within a region of the MLS. By optimizing the superconducting magnet's magnetic field strength and the current in the one or more Maxwell coils, an unprecedented $V_{1\%}$ of over 4000 µL may be achieved within a more compact coil size of approximately 8 cm in diameter (or any other diameter). This optimal $V_{1\%}$ may further increase with the size and the field strength of the MLS. To further demonstrate the usefulness of this MLS, FIGS. 7A-7C show an example in which current and the field strength associated with an MLS are reduced to emulate the gravity on Mars ($g_M$=0.38 g). A functional volume over 20,000 µL can be produced in this scenario, in which the gravity may only vary within a few percent of $g_M$.

Beginning with the operation of a conventional solenoid MLS, the mechanism of magnetic levitation may be understood by considering a small sample (of volume $\Delta V$) placed in a static magnetic field B(r). Owing to the magnetization of the sample material, the energy of the magnetic field increases by:

$$\Delta E_B = \frac{-\chi B^2(r)}{2\mu_0(1+\chi)} \Delta V \qquad \text{(Equation 1)}$$

where $\chi$ may be the magnetic susceptibility of the sample material, and to may be the vacuum permeability. For diamagnetic materials with a negative $\chi$, $\Delta E_B$ may be positive and therefore may require energy to insert a diamagnetic sample into the B(r) field. Table 1 presented below may provide definitions of variables used in Equation 1.

TABLE 1

| | |
|---|---|
| $\Delta E_B$ | Change in the energy of the magnetic field |
| $\chi$ | Magnetic susceptibility of the sample material |
| r | Position vector |
| B(r) | Magnetic field vector at location r |
| $\mu_0$ | Vacuum magnetic permeability |
| $\Delta V$ | Sample volume |

To account for the impacts of gravity, the total potential energy associated with the sample per unit volume may be defined as:

$$E(r) = \frac{-\chi B^2(r)}{2\mu_0(1+\chi)} + \rho g z \qquad \text{(Equation 2)}$$

where ρ is the material density and z denotes the vertical coordinate. Table 2 presented below may provide definitions of variables used in Equation 2.

TABLE 2

| | |
|---|---|
| E(r) | Specific energy of the sample in the magnetic field at location r |
| ρ | Material density |
| g | Gravitational acceleration |
| z | Vertical coordinate |

This energy leads to a force per unit volume acting on the sample defined as:

$$F = -\nabla E(r) = \frac{\chi}{\mu_0(1+\chi)}(\nabla B)*B - \rho g \hat{e}_z \qquad \text{(Equation 3)}$$

Table 3 presented below may provide definitions of variables used in Equation 3.

TABLE 3

| Force per unit volume acting on the sample | |
|---|---|
| $\nabla$ | Gradient operation which is equal to $\left(\frac{\partial}{\partial x}\hat{\imath} + \frac{\partial}{\partial y}\hat{\jmath} + \frac{\partial}{\partial z}\hat{k}\right)$ in the Cartesian coordinate system |

For an appropriate non-uniform magnetic field, the vertical component of the field-gradient force (i.e., the first term on the right side in Equation 3) may balance the gravitational force at a particular location (for example, the levitation point). Suspension of a sample may therefore be achieved with this region.

In order to attain a stable levitation of the sample within the region, the specific potential energy, E, may be required to have a local minimum at the levitation point so the sample is not able to unintentionally exit the low-gravity region (for example, fall from the region to an external region in which the low-gravity conditions are not present). Since E may depend on material properties besides the B(r) field, the sample material may need to be specified. Given that water has been utilized in a wide range of low-gravity research and is also the main constituent of living cells and organisms, the properties of water may be adopted at ambient temperature (for example, $\chi=-9.1\times10^{-6}$ and $\rho=10^3$ kg/m3) in subsequent analyses (however, this is merely exemplary and not intended to be limiting). To determine the effect of the B(r) field, a solenoid may be considered with a diameter (D) of 8 cm and a height of $D\sqrt{3}/2$, as shown in FIG. 2A (however, any other dimensions are also possible). These dimensions may be selected to match the size of the MLS that is discussed below (for example, the solenoid MLS 200 shown in FIG. 2A). For a solenoid with 'N' turns and with an applied current, I, B(r) may be calculated using a known integral formula that depends on the product, NI. E(r) in the full space may then be determined.

Figure 2C:
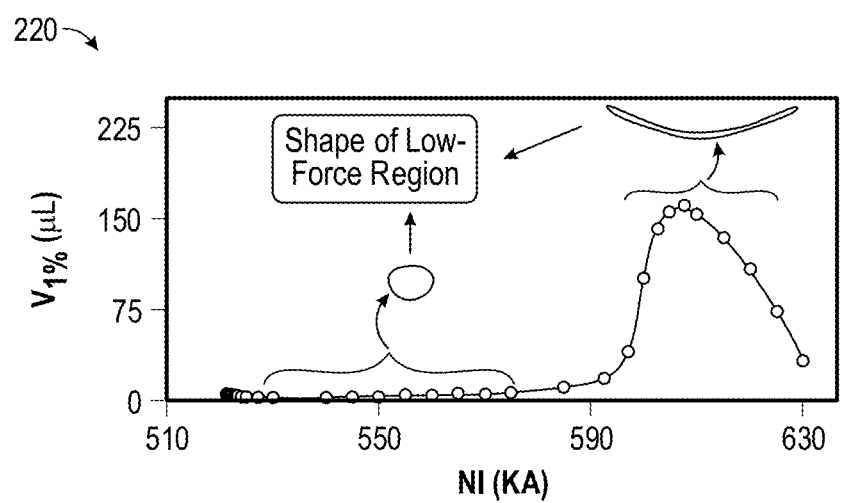

FIG. 2C, also shows the calculated E(r) near the top opening of the solenoid when a turn-current of NI=607.5 kA is applied. In general, E may be high near the solenoid wall due to the existence of a strong magnetic (B) field at that location. Slightly above the solenoid, there may be a trapping region (shown in FIG. 2B as a dashed contour 206) in which E decreases towards the center region. When a water sample is placed in this region (while reference is made herein to a water sample, this is merely exemplary, and any other type of sample may also be provided within the MLS), the water sample moves towards the center region where the net force is zero (for example, the levitation point). The specific force field may also be calculated using Equation 3.

The solid contour 208 in FIG. 2B denotes the low-force region in which the net force corresponds to an acceleration <0.01 g. The overlapping volume of the trapping region and the low-force region may be defined as a functional volume, $V_{1\%}$, where the sample not only experiences a weak residue force but may also remain trapped. Also in FIG. 2C, the calculated $V_{1\%}$ may be shown as a function of NI. The trapping region may emerge only above a threshold turn-current of about NI=520 kA. As NI increases, $V_{1\%}$ first remains small (i.e., a few μL) and has a shape similar to an inverted raindrop. When NI is above a threshold of approximately 600 kA, $V_{1\%}$ may grow rapidly and peaks at NI=607.5 kA before it drops with further increasing NI. In the peak regime, $V_{1\%}$ may have a highly anisotropic shape due to the non-uniform force field, which may make the low-gravity region unsuitable for practical applications despite the enhanced $V_{1\%}$ value. The required extremely large turn-current may also present a great challenge.

To increase $V_{1\%}$, a more uniform field-gradient force may be produced to balance the gravitational force, such that the net force may remain low in a large volume. Based on Equation 3, this may be achieved if a nearly uniform B field exists and the field gradient is almost constant in the same volume. These two conditions may be satisfied approximately. The solution may to superimpose a strong uniform field $B_0$ with a weak field $B_1(r)$ that has a fairly constant field-gradient $\nabla B_1$. In this way, the total field $B=B_0+B_1 \cong B_0$ may be approximately uniform and its gradient $\nabla B \cong \nabla B_1$ may also remain nearly constant.

Turning to the functionality of the improved MLS described herein, the uniform field $B_0$ can be produced in the bore of a superconducting solenoid magnet. For superconducting magnets used in magnetic resonance imaging applications, spatial uniformity of the field greater than a few parts per million (ppm) in a space large enough to hold a person is possible. As for the $B_1$ field, the field may be produced using a gradient-field Maxwell coil. As shown in FIG. 3A, such a coil may include two identical current loops (diameter D) placed coaxially at a separation distance of D√3/2. The current in the top loop may be provided in a clockwise direction (viewed from the top) while the current in the bottom loop made be provided in a counterclockwise direction (however, the opposite may also be true). Such a coil configuration may produce a highly uniform field gradient in the region between the two loops.

The $B_1(r)$ generated by the gradient-field Maxwell coil may be calculated using the Biot-Savart law (details provided below), from which the specific potential energy E for an inserted water sample can again be determined. As an example, it is shown in FIG. 3B that the calculated E(r) profile for a coil with a diameter of 8 cm and with an applied current of 112.6 kA in the presence of a uniform field, $B_0$, of 24 T. Again, the dashed contour and the solid contour may be used to show, respectively, the trapping region and the 0.01 g low-force region. By evaluating the overlapping volume of the two regions, a volume ($V_{1\%}$) of approximately 4004 μL may be obtained. More importantly, this functional volume is much more isotropic compared to the volume produced by the existing solenoid MLS (shown in FIG. 2B), which makes this improved MLS highly desirable in practical applications.

Figure 4A:
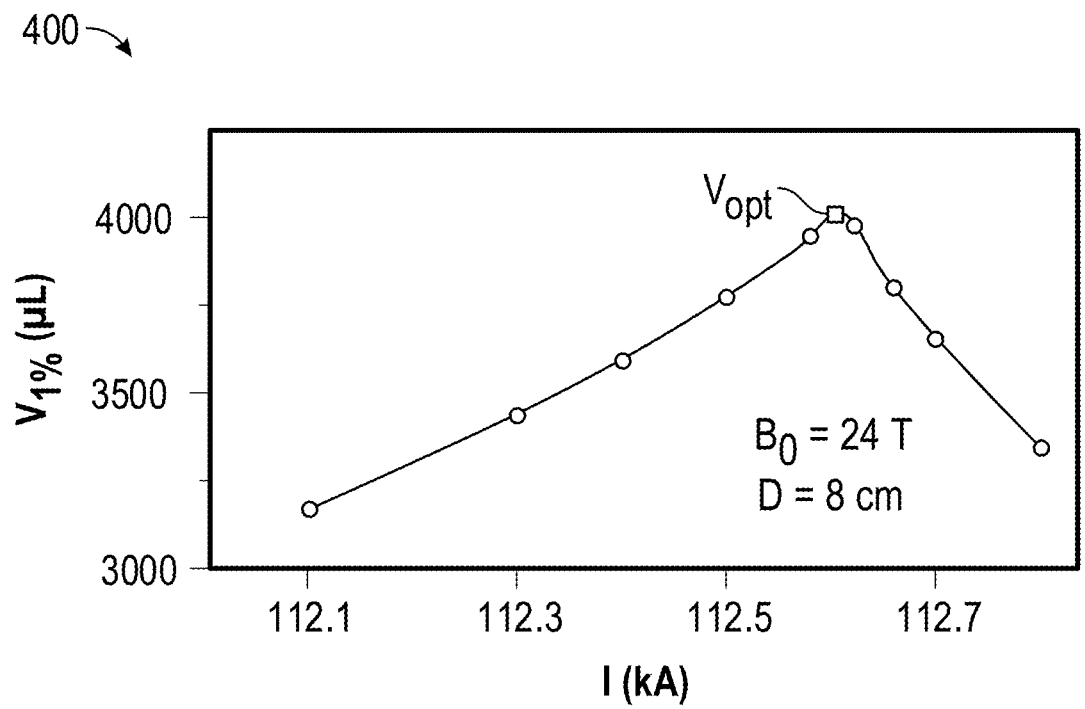
FIGS. 4A-4B illustrate an optimization analysis of the functional volume of an MLS design, in accordance with one or more embodiments of the disclosure.
Figure 4B:
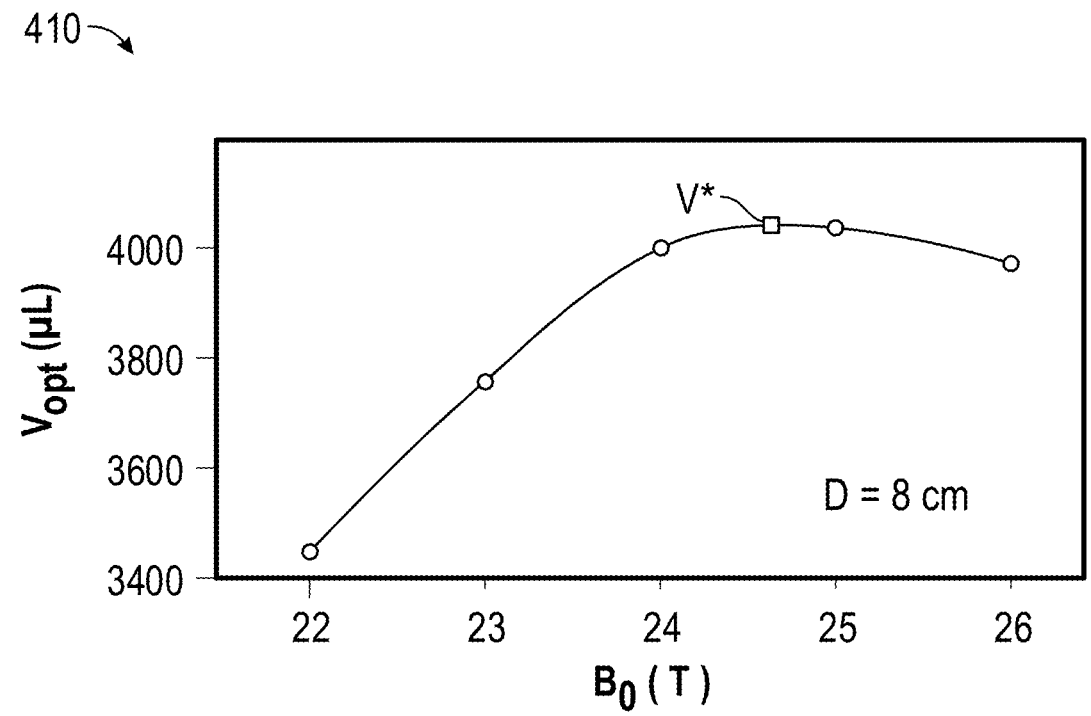

To optimize the coil current, I, and the base field, $B_0$, further analyses have been conducted. First, for a fixed $B_0$, the coil current may be varied. Representative results at $B_0$=24 T are shown in FIGS. 4A-4B. From the figures, it is exemplified that $V_{1\%}$ may peak at about I=112.6 kA. This peak value is denoted as $V_{opt}$. The decrease of $V_{1\%}$ at a large current may be caused by the fact that the magnetic field generated by the coil is no longer much smaller than the base field $B_0$, which may impair the uniformity of the field-gradient force.

Next, the base field strength, $B_0$, may be varied and determine the corresponding $V_{opt}$ at each $B_0$. The result is shown in FIG. 4B. As shown in the figure, there may exist an optimal base field strength of approximately 24.7 T (denoted as $B_0^*$), where an overall maximum functional volume (denoted as V*) of ~4050 μL may be achieved. This volume is comparable to those of the largest water drops adopted in the past spaceflight experiments. The above analyses assumed a fixed coil diameter 8 cm (however, any other diameter may be used). When the diameter varies, the maximum functional volume V* and the corresponding MLS parameters (for example, I* and $B_0^*$) may also change.

To examine the coil-size effect, the aforementioned analyses may be repeated with a number of coil diameters. The results may be shown in FIGS. 5A-5B. As D increases from 6 cm to 14 cm, the maximum functional volume V* may increase from ~1500 μL to over 21,000 μL, i.e., over 14 times. Meanwhile, the required coil current I* and the base field strength $B_0^*$ may increase almost linearly with D by factors of approximately 4 and 1.3, respectively. This analysis may suggest that it is advantageous to have a larger coil provided that the desired I* and $B_0^*$ may be achieved.

The improved MLS may be provided an applied current of the order 10^2 kA in both loops of the gradient-field Maxwell coil (however, other currents may also be used). To allow for this current to be provided, loops may be constructed using a thin copper wire with 10^3 turns (or any other number of turns) so that a current of the order 10^2 A in the wire is sufficient. However, simple estimation reveals that the Joule heating in the resistive wire can become so large that the wire could melt. To solve this issue, the Maxwell coil can be fabricated using REBCO (i.e., rare-earth barium copper oxide) superconducting tapes. A schematic of the improved MLS setup is shown in FIGS. 1A-1B.

In one or more embodiments, a 24-T superconducting magnet with a bore diameter of 120 mm may be assumed for producing the $B_0$ field (however, any other properties may be applicable). Four sets of gradient-field Maxwell coils made of REBCO pancake rings may be placed in the bore of the superconducting magnet. Each pancake ring may be made of 94 turns of the REBCO tape (width: 4 mm; thickness: 0.043 mm) so its cross-section is nearly a square (i.e., 4 mm by 4 mm). The pancake rings may be arranged along the diagonal lines of a standard gradient-field Maxwell coil and the average diameter of the pancake rings may be approximately 8 cm. These specifications are merely exemplary and not intended to be limiting in any way. Any other dimensions, number of turns, and/or any other specifications of the Maxwell coils, superconducting magnet, or otherwise may also be applicable.

This coil configuration may produce a $B_1$ field with minimal deviations from that of an ideal gradient-field Maxwell coil. While the superconducting magnet may be cooled by immersion in a liquid helium bath, the compact REBCO coils could be cooled conveniently by a 4-K pulse-tube cryocooler (the term "cryostat" is used interchangeably with "cryocooler" herein) inside a shielded vacuum housing. The superconducting magnet and Maxwell coils may similarly be cooled in any other manner as well. A room-temperature center bore with a diameter as large as 6 cm (or any other diameter) can be used for sample loading and observation. When a current of approximately 290 A is applied in the REBCO tapes, a total turn-current NI=4×94× 290 A≈109 kA may be achieved. In some instances, the quenching critical current of the REBCO tape can reach 700 A, even under an external magnetic field of 30 T. Therefore, operating the REBCO coils with a tape current of 290 A will produce reliable operation. It should be noted that while a particular configuration may be described above (or elsewhere herein), the specific numbers that are described are merely exemplary, and are not intended to be limiting in any way.

Figure 1A:
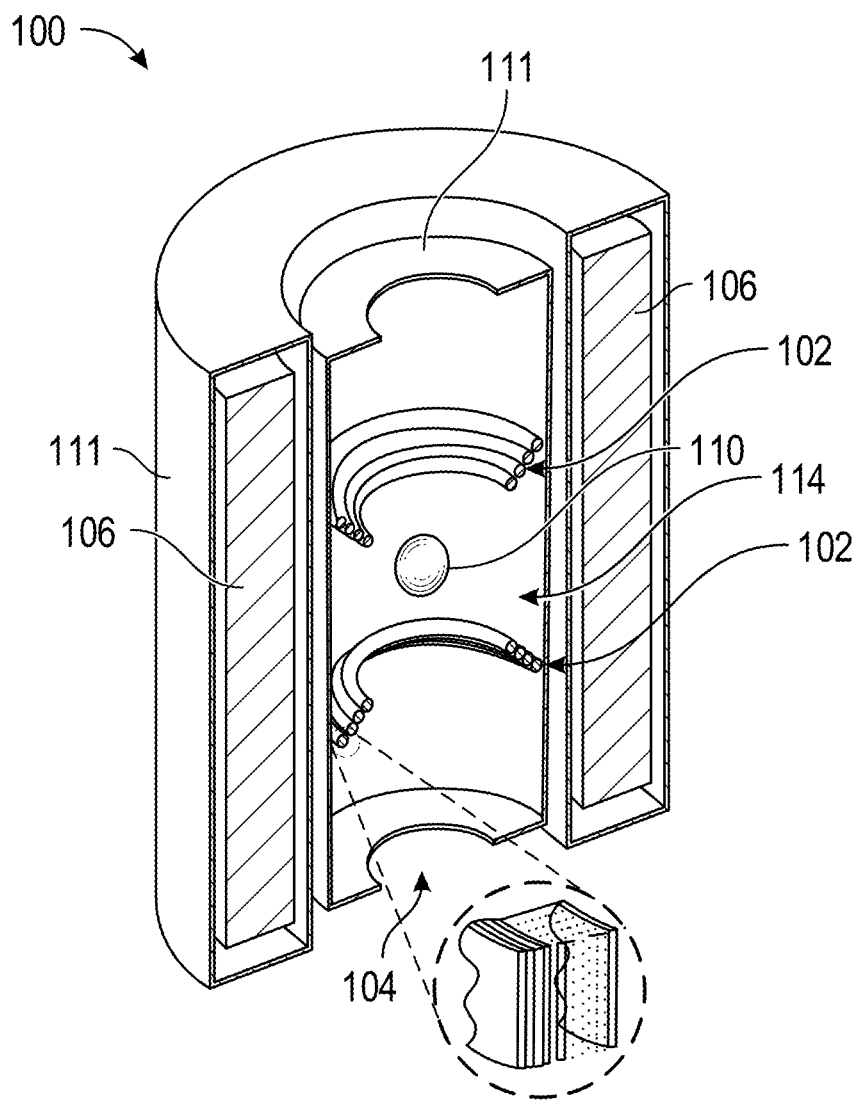
FIG. 1A illustrates a perspective view of a cross-section of an MLS, in accordance with one or more embodiments of the disclosure.
Figure 1B:
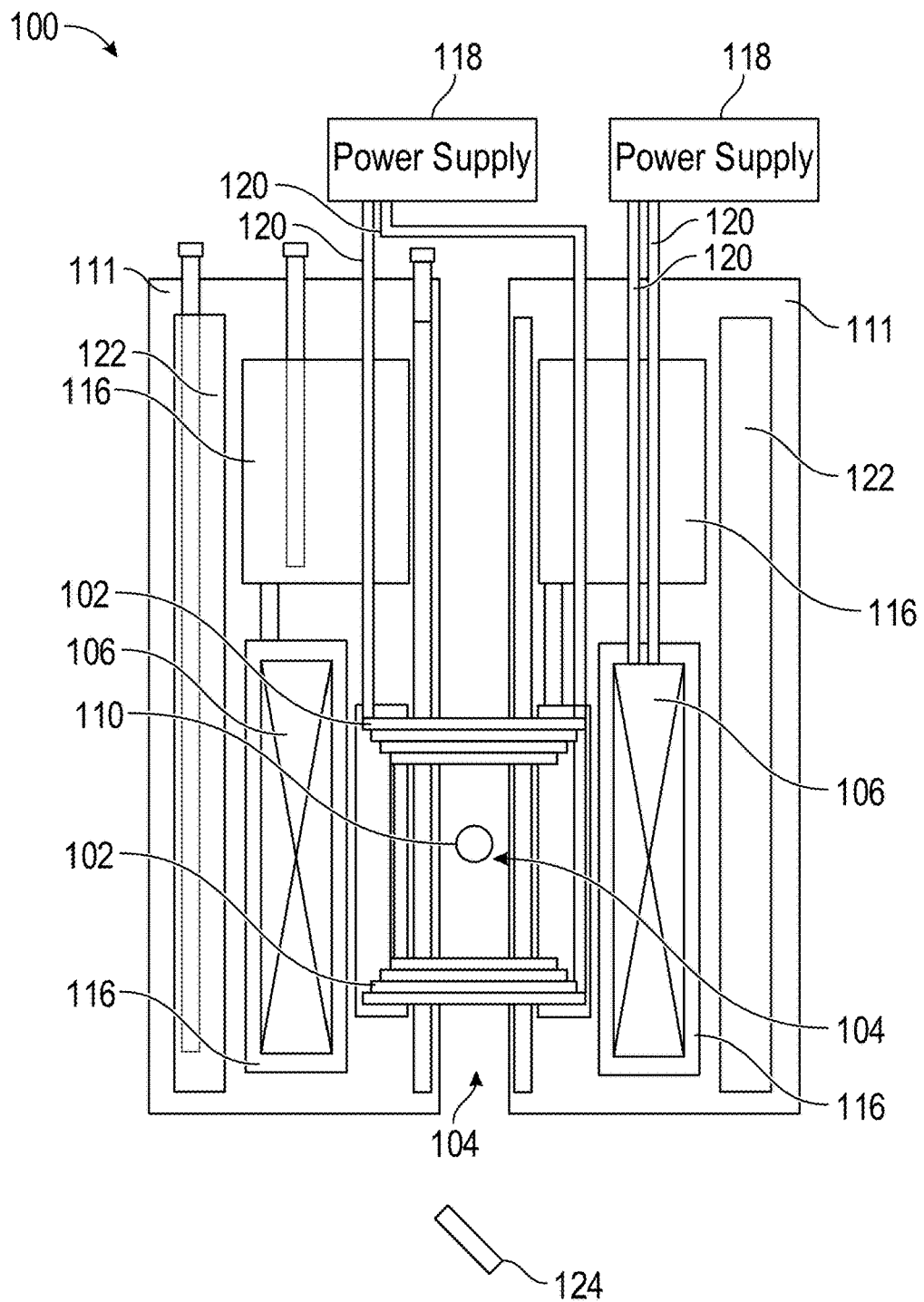
FIG. 1B illustrates another cross-section of an MLS, in accordance with one or more embodiments of the disclosure.

To prove the performance of the practical MLS design as depicted in FIGS. 1A-1B, the previously presented optimization analyses were repeated. A representative plot of the specific potential energy E(r) at a total turn-current NI=108.37 kA and $B_0$=24 T is shown in FIG. 6C. The overall shapes of the trapping region and the low-force region are nearly identical to those of the ideal gradient-field Maxwell coil. The dependence of $V_{1\%}$ on the turn-current NI at $B_0$=24 T is shown in FIG. 6B. A peak functional volume $V_{opt}$ of ~3450 µL is achieved. In FIG. 6C, the peak volume $V_{opt}$ obtained at various base field strength $B_0$ is shown. Again, the trend is similar to that in FIGS. 4A-4B. Therefore, despite the change in the coil geometry as compared with the ideal gradient-field Maxwell coil, the performance of the MLS configuration described herein does not exhibit any significant degradation.

Besides levitating samples for near-zero gravity research, the improved MLS described herein can also be tuned to partially cancel the Earth's gravity so that ground-based emulation of reduced gravities in the extraterrestrial environments (such as on the Moon or Mars, for example) can be achieved. To demonstrate this potential, further analyses are presented of the practical MLS shown in FIGS. 6A-6C with lower applied currents for simulating the Martian gravity $g_M$=0.38 g.

In FIGS. 7A-7C, a contour plot of the specific potential energy E(r) for water samples in the practical MLS is shown when a turn-current of NI=66.55 kA is applied at $B_0$=24 T. These figures illustrate that the energy contour lines (red curves) are evenly spaced in the center region of the MLS, suggesting a fairly uniform and downward-pointing force in this region. The magnitude of the force may then be determined using Equation 3. The two black contours in FIG. 7A may represent the boundaries of the regions in which the total force leads to an effective gravitational acceleration within 1% and 5% of $g_M$, respectively. If the volume of the contour in which the gravity varies is defined within 5% of $g_M$ as the functional volume $V_M$, its dependence on the turn-current at $B_0$=24 T is shown in FIG. 6. This functional volume may have a peak value $V_{opt}$ of ~22.5×10^3 µL at NI=66.55 kA. This peak volume is so large that even small animals or plants can be accommodated inside. The peak volume has also been calculated at different base field strength $B_0$. As shown in FIG. 6, initially the peak volume $V_{opt}$ increases sharply with $B_0$, and then may gradually saturate when $B_0$ is >~24 T. Operating the MLS at higher $B_0$ may provide a marginal gain in the functional volume.

These analyses clearly illustrate the superiority of the improved MSL configuration as described herein in comparison with conventional solenoid MLSs. An unprecedentedly large and isotropic functional volume, i.e., about three orders of magnitude larger than that for a conventional solenoid MSL, can be achieved. The implementation of the superconducting magnet technology will also ensure the stable operation of this MLS with a minimal energy consumption rate, which is ideal for future low-gravity research and applications.

The magnetic field B(r) generated at r by a current loop in three-dimensional space can be calculated using the Biot-Savart law:

$$B(r) = \frac{\mu_0 I}{4\pi} \oint \frac{dl * (r-1)}{|r-1|^3} \quad \text{(Equation 4)}$$

where dl may be the elementary length vector along the current loop. For a field-gradient Maxwell coil with a radius R=D/2, the generated magnetic field $B_1(r)$ can be decomposed into an axial component and a radial component due to the axial symmetry. Table 4 presented below may provide definitions of variables used in Equation 4.

TABLE 4

| | |
|---|---|
| dl | An infinitesimal length vector along the Maxwell current loop |
| I | Electrical current in each Maxwell loop |
| × | Vector cross product which is defined as a × b = ‖ a ‖ ‖ b ‖ sinθn where n is the unit vector perpendicular to the plane containing a and b, in the direction given by the right-hand rule |
| $\oint$ | Integration along the closed current loop |
| 1 | Position vector of the current loop segment dl |

If the z axis is set along the co-axial line of the two loops and place the coordinate origin at the center of the bottom loop, the two components can be evaluated as:

$$B_1^{(r)}(r, z) = \frac{\mu_0 I}{4\pi} \int_0^{2\pi} \left[ \frac{Rz\cos(\phi)}{R_1^3} + \frac{R(L-z)\cos(\phi)}{R_2^3} \right] d\phi \quad \text{(Equation 5)}$$

$$B_1^{(r)}(r, z) = \frac{\mu_0}{4\pi} \int_0^{2\pi} \left[ \frac{R^2 - Rr\cos(\phi)}{R_1^3} + \frac{rR\cos(\phi) - R^2}{R_2^3} \right] d\phi \quad \text{(Equation 6)}$$

$$R_1 = \sqrt{[r - R\cos(\phi)]^2 + [R\sin(\phi)]^2 + z^2}$$

$$R_2 = \sqrt{[r - R\cos(\phi)]^2 + [R\sin(\phi)]^2 + (z-L)^2}$$

L=D√3/2 may be the separation distance between the two loops, and I is the current in each loop. Table 5 presented below may provide definitions of variables used in Equations 5-6.

TABLE 5

| | |
|---|---|
| R | Radius of each current loop in Maxwell coil |
| L | Separation distance between two current loops in Maxwell coil |
| r | Radial coordinate in the cylindrical coordinate system |
| ∅ | Azimuthal angle coordinate in the cylindrical coordinate system |
| $B_1^{(r)}(r, z)$ | Generated magnetic field due to the Maxwell coil along r-axis at location (r, z) |
| $B_1^{(z)}(r, z)$ | Generated magnetic field due to the Maxwell coil along z-axis at location (r, z) |

The magnetic field $B_1(r)$ generated by the improved MLS design as depicted in FIG. 5 can be calculated by superimposing the fields produced by the four sets of field-gradient Maxwell coils. The field of each coil is evaluated in the same way as outlined above. Counting in the base field $B_0$, the total field may then be by $B(r)=[B_0+B_1{}^z(r)]\hat{e}_z+B_1{}'(r)\hat{e}_r$.

For a solenoid with a length L and a radius R, if it is assumed the wire is thin such that the turn number N is large, but the total turn-current NI remains finite, an exact expression for the generated magnetic field can be derived based on the Biot-Savart law:

$$B^{(r)}(r,z) = \frac{\mu_0 NI}{4\pi}\frac{2}{L}\sqrt{\frac{R}{r}}\left[\frac{k^2-2}{k}K(k^2) + \frac{2}{k}E(k^2)\right]_{\zeta_-}^{\zeta_+} \quad \text{(Equation 7)}$$

$$B^{(z)}(r,z) = \frac{\mu_0 NI}{4\pi}\frac{1}{L\sqrt{Rr}}\left[\zeta k\left(K(k^2) + \frac{R-r}{R+r}\prod(h^2,k^2)\right)\right]_{\zeta_-}^{\zeta_+} \quad \text{(Equation 8)}$$

$$k^2 = \frac{4Rr}{(R+r)^2+\zeta^2}$$

$$h^2 = \frac{4Rr}{(R+r)^2}$$

$$\zeta_\pm = z \pm L/2$$

$$K(k^2) = \int_0^{\pi/2}\frac{d\theta}{\sqrt{1-k^2\sin^2\theta}} \quad \text{(Equation 9)}$$

$$E(k^2) = \int_0^{\pi/2}d\theta\sqrt{1-k^2\sin^2\theta}$$

$$\prod(h^2,k^2) = \int_0^{\pi/2}\frac{d\theta}{(1-h^2\sin^2\theta)\sqrt{1-k^2\sin^2\theta}}$$

Table 6 presented below may provide definitions of variables used in Equations 7-9.

TABLE 6

| | |
|---|---|
| $B^{(r)}(r, z)$ | Generated magnetic field due to a solenoid along r-axis at location (r, z) |
| $B^{(z)}(r, z)$ | Generated magnetic field due to a solenoid along z-axis at location (r, z) |
| R | Solenoid radius |
| L | Solenoid length |
| N | Number of electrical current turns |
| I | Electrical current in each turn of the solenoid |

The magnetic fields produced by the solenoid, the ideal gradient-field Maxwell coil, and the practical MLS design may be calculated using software, such as MATLAB, for example. Considering the axial symmetry, only the fields in the r-z plane may be evaluated. The sizes of the computational domains for different types of designs are essentially shown in FIGS. 1A-1B, 2A-2C, 3A-3B, and 6A-6C. Typically, the computational domain is discretized using a square grid with spatial resolutions $\Delta r=10$ μm and $\Delta z=10$ μm. The calculations may assume water properties at ambient temperature, but the same procedures can be applied to other materials with different magnetic susceptibilities and densities.

Turning to the figures, FIG. 1A illustrates a perspective view of a cross-section of an MLS 100, in accordance with one or more embodiments of the disclosure. In one or more embodiments, the MLS 100 may include one or more Maxwell coils 102 (for example, gradient-field Maxwell coils or any other type of Maxwell coils) disposed within a bore 104 of a superconducting (SC) magnet 106. The one or more Maxwell coils, the superconducting magnet 106, and/or any other components of the MLS 100 may also be provided within a housing 111. A Maxwell coil is combination of at least two coils capable of producing a region of almost constant (or constant-gradient) magnetic field when a current is provided to the coils. An example of a single gradient-field Maxwell coil is illustrated and described in additional detail with respect to FIG. 3A. A superconducting magnet is an electromagnet made from coils of superconducting wire. That is, the wire comprises material that has superconducting properties. For example, superconductor material classes include chemical elements (e.g. mercury or lead), alloys (such as niobium-titanium, germanium-niobium, and niobium nitride), ceramics (YBCO and magnesium diboride), superconducting pnictides (like fluorine-doped LaOFeAs) or organic superconductors (fullerenes and carbon nanotubes). The superconducting magnet is capable of producing zero electrical resistance, and thus may be able to conduct larger electric currents than ordinary wires, which may result in large magnetic fields being produced by a more compact component.

In one particular embodiment, the MLS 100 may include a 24 T superconducting magnet with four sets of gradient-field Maxwell coils comprising REBCO "pancake rings." The average diameter of the pancake rings may be approximately 8 cm. However, this is merely one example configuration and is not intended to be limiting. That is, any other type of superconducting magnet and any other type of Maxwell coils may be used as well. Additionally, the one or more Maxwell coils 102 and superconducting magnet 106 (as well as any other components of the MLS 100) may be provided in any other dimensions.

When current is provided to the one or more Maxwell coils 102 and the superconducting magnet 106, a large magnetic field may be generated within the MLS 100, which produces a low-gravity environment within the volume 114. By optimizing the superconducting magnet's magnetic field strength and the current in the one or more Maxwell coils, an unprecedented $V_{1\%}$ of over 4000 μL may be achieved within a more compact coil size of approximately 8 cm in diameter (or any other diameter). That is, the MLS 100 may be configured to simulate a low gravity environment that would be found in extraterrestrial environments (such as on the Moon or Mars, for example).

An object may be provided within the volume 114 to test the impacts of the low gravity environment on the object. That is, the object may be provided within the MLS 100 through the bore 104. When the object reaches the volume 114, the low-gravity environment produced by the operation of the one or more Maxwell coils 102 and the superconducting magnet 106 may cause the object to levitate within the volume 114. The object may continue to levitate within the volume 114 while the current is provided to the one or more Maxwell coils 102 and the superconducting magnet 106, thus simulating the impact of the low-gravity environment on the object. For example, the figure shows sample 110 provided within the volume 114. Given that the volume 114 is a low-gravity region, the sample 110 is shown as levitating within the volume 114.

FIG. 1B illustrates another cross-section of an MLS 100, in accordance with one or more embodiments of the disclosure. This cross-section provides a more comprehensive view of the various components that are included within the MLS 100. Similar to FIG. 1A, FIG. 1B shows the one or more Maxwell coils 102 disposed within the bore 104 of the superconducting magnet 106. The one or more Maxwell coils 102 and the superconducting magnet 106 may be provided within the housing 111.

In one example embodiment, the separation between the one or more Maxwell coils 102 may be approximately 6.9 cm and the diameter of the one or more Maxwell coils 102 may be approximately 8 cm. Additionally, an internal diameter of the superconducting magnet bore may be approximately 12 cm. However, these dimensions are merely exemplary and any other dimensions may also be used.

The figure also shows that at least the superconducting magnet 106 is provided within a cooling agent. In one or more embodiments, the cooling agent may include liquid helium, which may be provided in an enclosure to form a cryostat. To ensure that the superconducting magnet 106 remains in a superconducting state, the superconducting magnet 106 may need to be cooled to a particular threshold temperature. Generally, superconducting materials may lose electrical resistance when they are cooled to a temperature near absolute zero (this temperature is called the critical temperature (Tc) and is different for each material). Thus, the superconducting magnet 106 is provided within the cooling agent to maintain the superconducting magnet 106 at the critical temperature. However, while the cooling agent is provided within the MLS 100, not all of the MLS 100 is necessarily cooled to these same near absolute zero temperatures. For example, the bore 104 may be provided at a room temperature. The bore 104 may also be provided to any other temperature to reflect a low gravity extraterrestrial testing environment as well.

In one or more embodiments, current may be supplied to the one or more Maxwell coils 102 and the superconducting magnet 106 using one or more power supplies 118. The one or more power supplies 118 may be electrically connected to the one or more Maxwell coils 102 and the superconducting magnet 106 through various conductive elements 120, such as one or more wires including any type of conductive material, such as Copper, etc.

The MLS 100 may also include a shield 122. The shield 122 may be provided within the housing 130 and around the one or more Maxwell coils 102 and the superconducting magnet 106. The shield 122 (which may be a Nitrogen shield, for example) may be used to mitigate the radiative heating from the room temperature environment to the cold core of the MLS 100. The environment may typically be at a room temperature of approximately 300 K. However, the cold core (for example, the superconducting magnet 106 and the Maxwell coils 102) is typically kept at liquid helium temperature (for example, 4 K). As a result, the radiative heating from environment to the cold core may be significant. Using a liquid nitrogen shielding (for example, a cylindrical shell container filled with liquid nitrogen), this radiative heating may be adsorbed in liquid nitrogen and prevent the heat from leaking into the cold core. This allows for the low temperature of the superconducting magnet 106 to be maintained.

The figure also shows a mirror 124 provided at an angle such that a user may be able to view the interior of the MLS 100 (for example, the bore 104) using the mirror in order to observe the sample 110 within the bore 104. This is merely one example of a form of "optical access" to the interior of the MLS 100. Additionally examples may include positioning an image (and/or video) capture device, such as a camera, facing the bore 104.

FIGS. 2A-2C illustrate a functional volume analysis for a conventional solenoid MLS, in accordance with one or more embodiments of the disclosure. Beginning with FIG. 2A, a conventional solenoid 200 is shown. A solenoid 200 is a type of electromagnet formed by a helical coil of wire whose length is greater than its diameter. The wire may comprise any type of conductive material, such as Copper, Aluminum, etc. When a current is provided through the solenoid 200, a uniform magnetic field (not shown in the figure) may be generated. The strength of the magnetic field that is produced may be proportional to the amount of current provided to the coils. In one embodiment, the solenoid 200 may be provided with a diameter (D) of 8 cm and a height (H) of D$\sqrt{3}$/2. However, the solenoid 200 may also be configured to any other specification, including any other diameter and any other height.

FIG. 2B shows a plot 210 of an example calculated specific potential energy, E(r), of a small water sample placed within the magnetic field produced by the solenoid 200. The y-axis of the plot 210 represents varying distances along the height of the solenoid 200 (shown as the "z" axis in FIG. 2A). The x-axis of the plot 210 represents varying distances along the diameter of the solenoid 200 (shown as the "r" axis on FIG. 2A). The origin of the coordinates may be at the center of the solenoid 200. The shading provided within the plot 210 represents the magnitude of E(r) at various points within the solenoid 200. An indication of the varying magnitudes shown in the plot 210 is provided through the legend 212 provided above the plot 210.

FIG. 2B shows that the potential energy at the region proximate to the center of the solenoid 200 is lowest indicating that a low-gravity region is produced within this volume of the interior of the solenoid 200. The dashed contour 206 denotes the boundary of the trapping region in which the total specific potential energy decreases towards the center of this region. Therefore, when a sample is placed in this region, it moves towards the region center where the net force exerted on the sample is zero, i.e., the levitation point. The solid contour 208 denotes the low-force region within which the net force exerted on the sample corresponds to an acceleration smaller than 0.01 g. The overlapping volume of the trapping region and the low-force region is defined as the functional volume V1% where the sample not only experiences a very weak residue force, but also remains trapped.

FIG. 2C shows a plot 220 of the functional volume, $V_{1\%}$ (i.e., the overlapping volume of the two contours), versus the turn-current, NI. Representative shapes of the low-force region are shown. For this particular example, the turn-current, NI, of the solenoid is 607.5 kA (however, any other value may also be applicable as well). Thus, when this particular current is provided to the coils of the solenoid 200, the low-fore region is generated, which has a $V_{1\%}$ of approximately 150 µL.

In contrast with the conventional solenoid MLS 200 shown in FIG. 2A, FIGS. 3A-3B illustrate a functional volume of an MLS design using a Maxwell coil 300, in accordance with one or more embodiments of the disclosure. FIG. 3A shows a schematic of the Maxwell coil 300 (which may specifically be a gradient-field Maxwell coil). A constant-field Maxwell coil set consists of three coils oriented on the surface of a virtual sphere. A gradient-field Maxwell coil is essentially the same geometry of the 3-coil configuration above, with the central coil removed to leave only the smaller two coils (as shown in the figure). If the current in one of the coils is reversed, a uniform-gradient magnetic field is produced near the center of the two coils. In one embodiment, the Maxwell coil 300 may include a diameter (D) of 8 cm in the presence of an applied uniform field, $B_0$.

FIG. 3B shows a plot 310 of an example calculated specific potential energy E(r) of a small water sample placed in the magnetic field produced by the Maxwell coil 300 for I=112.6 kA and $B_0$=24 T. The origin of the coordinates is at the center of the bottom current loop. The y-axis of the plot 310 represents varying distances along the height of the solenoid 200 (shown as the "z" axis in FIG. 3A). The x-axis of the plot 310 represents varying distances along the diameter of the Maxwell coil 300 (shown as the "r" axis on FIG. 3A). The origin of the coordinates may be at the center of the Maxwell coil 300. The shading provided within the plot 310 represents the magnitude of E(r) at various points within the Maxwell coil 300. An indication of the varying magnitudes shown in the plot 310 is provided through the legend 312 provided above the plot 310. Similar to FIG. 2A, the black dashed contour 306 denotes the boundary of the trapping region, and the black solid contour 308 shows the low-force region (i.e., acceleration <0.01 g), As shown in the figure, the trapping region and the low-force region are both larger within the Maxwell coil 300 than the solenoid 200.

FIGS. 4A-4B illustrate an optimization analysis of the functional volume of an MLS design, in accordance with one or more embodiments of the disclosure. FIG. 4A shows a plot 400 of a calculated $V_{1\%}$ versus the loop current I for the Maxwell coil 300 shown in FIG. 3A with $B_0$=24 T. The largest $V_{1\%}$ is denoted as $V_{opt}$. FIG. 4B shows a plot 410 of the obtained $V_{opt}$ as a function of $B_0$. The overall maximum $V_{opt}$ is denoted as V*, and the corresponding coil current and base field are designated as I* and $B_0$*, respectively.

Figure 5A:
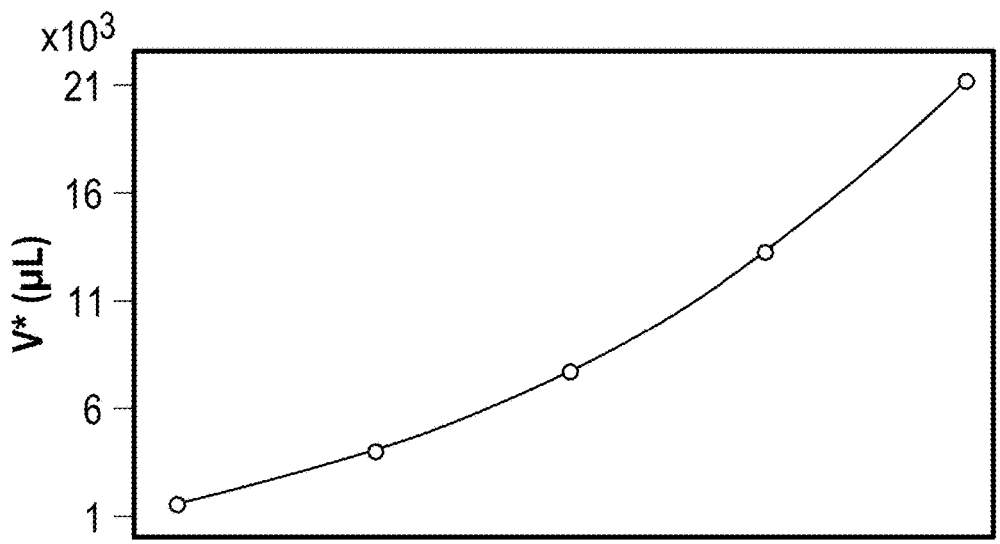
FIGS. 5A-5B illustrate plots showing coil-size dependence of optimal MLS parameters, in accordance with one or more embodiments of this disclosure.
Figure 5B:
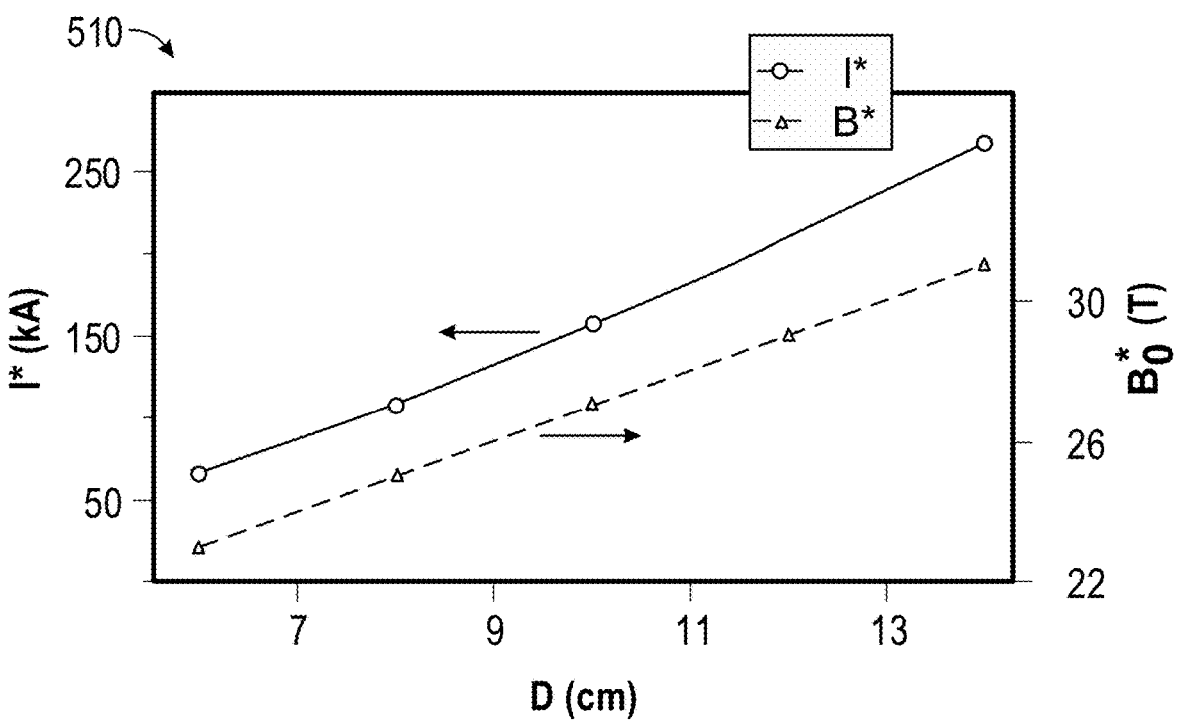

FIGS. 5A-5B illustrate plots showing coil-size dependence of optimal MLS parameters, in accordance with one or more embodiments of this disclosure. FIG. 5A shows a plot 500 of the maximum functional volume V* for coils with different diameters D. FIG. 5B shows a plot 510 of the required optimum I* and $B_0$* to achieve V* versus the coil diameter D.

Figure 6A:
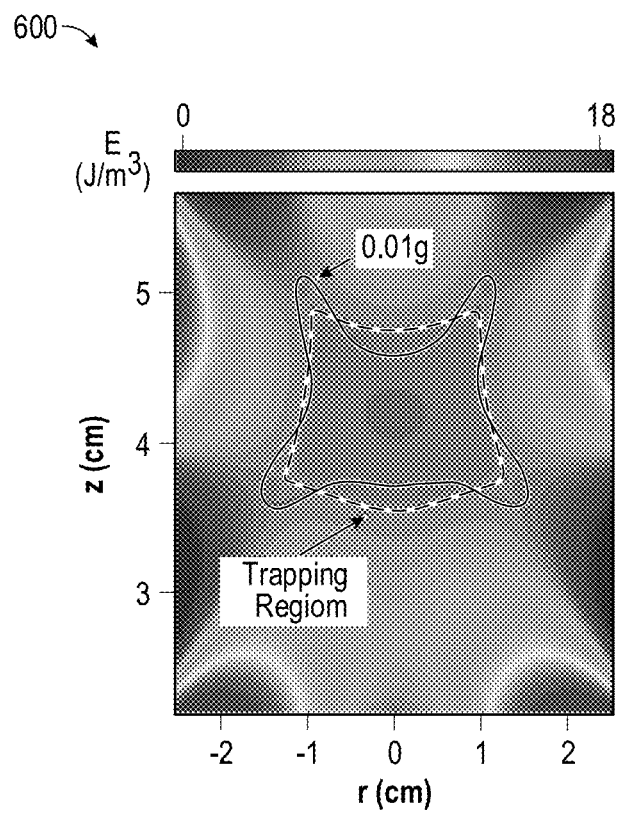
FIGS. 6A-6C illustrate a functional volume analysis for an MLS setup, in accordance with one or more embodiments of this disclosure.
Figure 6B:
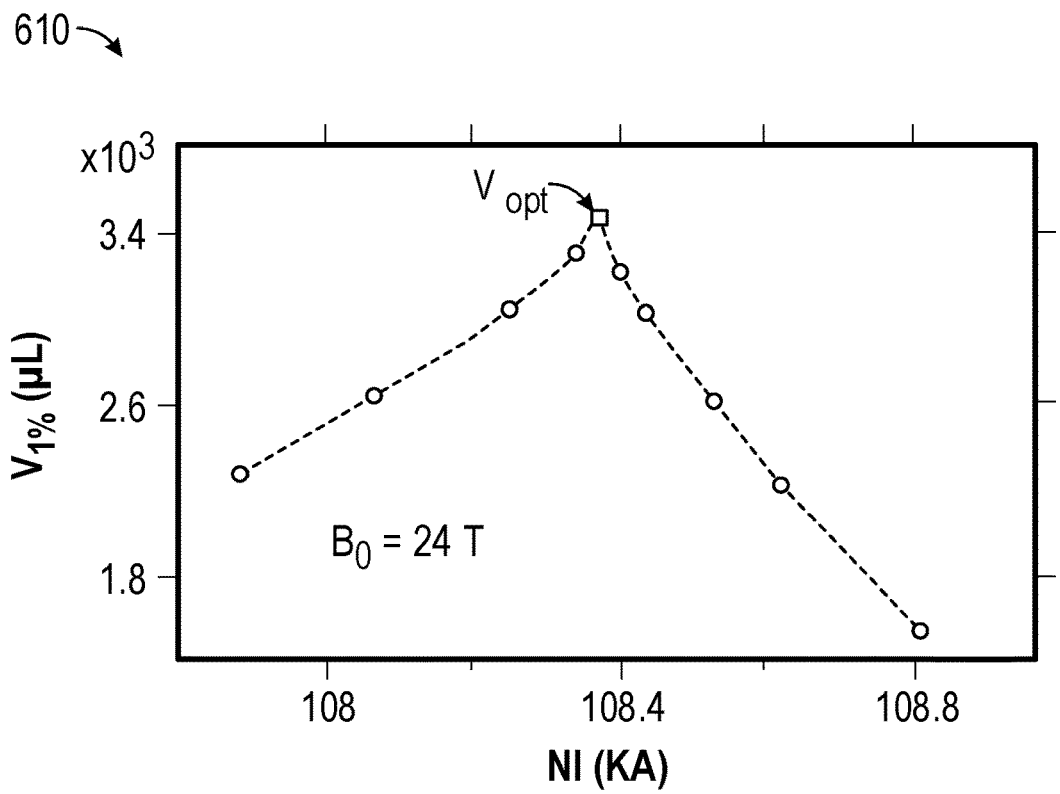
Figure 6C:
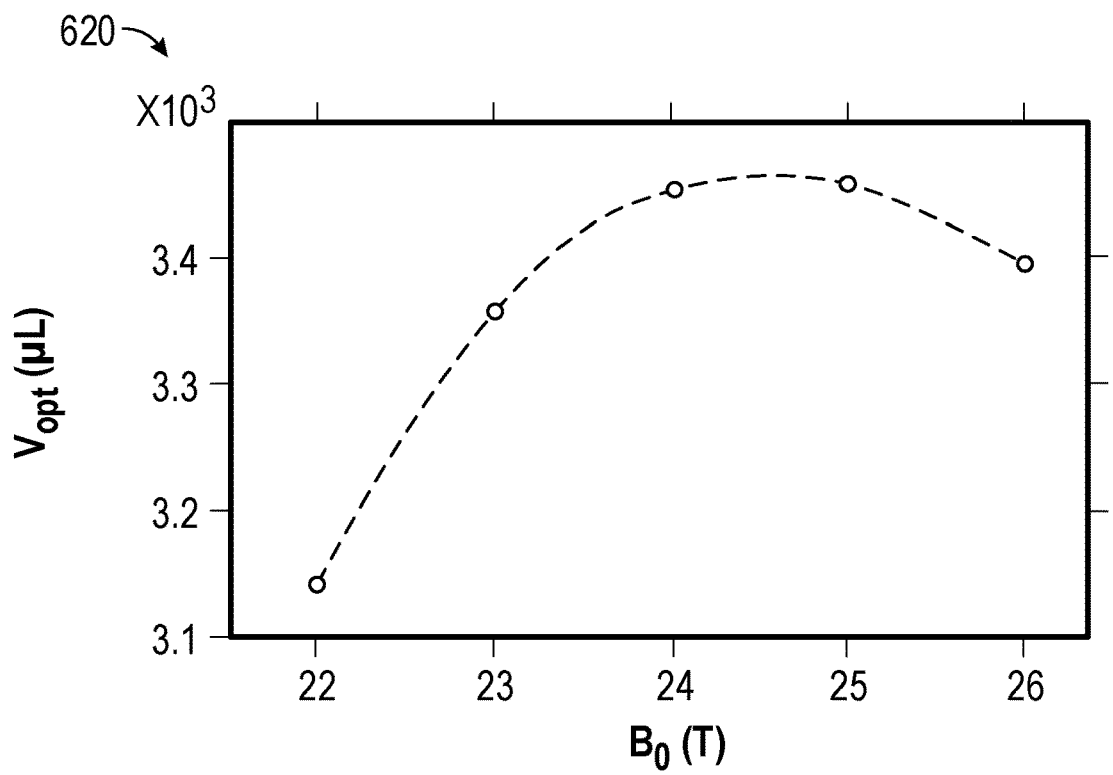

FIGS. 6A-6C illustrate a functional volume analysis for an MLS setup, in accordance with one or more embodiments of this disclosure. FIG. 6A shows a plot 600 of the calculated specific potential energy E(r) for a small water sample placed in this MLS with a total turn-current NI=108.37 kA. The origin of the coordinates may be at the center of the lowest pancake ring. The dashed contour may denote the boundary of the trapping region and the solid contour may show the 0.01 g low-force region. FIG. 6B shows a plot 610 of the calculated $V_{1\%}$ versus the turn-current NI at $B_0$=24 T. The peak $V_{1\%}$ is denoted as $V_{opt}$. FIG. 6C shows a plot 620 of the obtained $V_{opt}$ as a function of $B_0$.

FIGS. 7A-7C illustrate plots of the practical MLS as a simulator, in accordance with one or more embodiments of this disclosure. FIG. 7A shows a contour plot 700 of the specific potential energy E(r) at NI=66.55 kA and $B_0$=24 T in the improved MLS. The black contours may denote the boundaries of the regions in which the total force leads to an effective gravitational acceleration within 1% and 5% of $g_M$, respectively. FIG. 7B shows a plot 710 of the functional volume $V_M$ in which the gravity varies within 5% of $g_M$ versus the turn-current NI. FIG. 7C shows a plot 720 of the peak volume $V_{opt}$ versus $B_0$.

FIG. 8 illustrates an example method 800, in accordance with one or more embodiments of this disclosure. In one or more embodiments, block 802 of the method 800 may include producing a volume of low gravity within a device, wherein the volume is greater than 4,000 microliters (μL).

The operations described and depicted in the illustrative methods 800 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 8 may be performed.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A device comprising:
a superconducting magnet with a base field strength in a range of 24 to 25 Tesla (T); and
one or more Maxwell coils with a diameter of 8 centimeters (cm) and disposed within an internal bore of the superconducting magnet, wherein the device is configured to produce a volume of low gravity that is greater than 4,000 microliters (μL) based on a coil current in the one or more Maxwell coils in a range of 112 to 113 Kiloamperes (kA).

2. The device of claim 1, wherein the one or more Maxwell coils comprise a rare-earth barium copper oxide (REBCO) material.

3. The device of claim 2, wherein the Maxwell coils further include four sets of REBCO flat rings.

4. The device of claim 1, further comprising a cryostat, wherein the superconducting magnet is provided within the cryostat.

5. The device of claim 1, further comprising an electromagnetic shield surrounding the superconducting magnet and the one or more Maxwell coils.

6. A system comprising:
a superconducting magnet with a base field strength in a range of 24 to 25 Tesla (T); and
one or more Maxwell coils with a diameter of 8 centimeters (cm) and disposed within an internal bore of the superconducting magnet, wherein the system is configured to produce a volume of low gravity that is greater than 4,000 microliters (μL) based on a coil current in the one or more Maxwell coils in a range of 112 to 113 Kiloamperes (kA).

7. The system of claim 6, wherein the one or more Maxwell coils comprise a rare-earth barium copper oxide (REBCO) material.

8. The system of claim 7, wherein the Maxwell coils further include four sets of REBCO flat rings.

9. The system of claim 6, further comprising a cryostat, wherein the superconducting magnet is provided within the cryostat.

10. The system of claim 6, further comprising an electromagnetic shield surrounding the superconducting magnet and the one or more Maxwell coils.

11. A method comprising:
   producing a volume of low gravity within a device, wherein the volume is greater than 4,000 microliters (μL),
   wherein the device comprises a superconducting magnet with a base field strength in a range of 24 to 25 Tesla (T), and
   wherein the device further comprises one or more Maxwell coils with a diameter of 8 centimeters (cm) and disposed within an internal bore of the superconducting magnet, wherein the device is configured to produce the volume of low gravity that is greater than 4,000 microliters (μL) based on a coil current in the one or more Maxwell coils in a range of 112 to 113 Kiloamperes (kA).

12. The method of claim 11, wherein producing the volume of low gravity comprises providing a current to the device, wherein the device comprises:
   a superconducting magnet; and
   one or more Maxwell coils disposed within an internal bore of the superconducting magnet, wherein the device is configured to produce a volume of low gravity.

13. The method of claim 12, wherein the one or more Maxwell coils comprise a rare-earth barium copper oxide (REBCO) material.

14. The method of claim 13, wherein the one or more Maxwell coils further include four sets of REBCO flat rings.

15. The method of claim 12, further comprising a cryostat, wherein the superconducting magnet is provided within the cryostat.

\* \* \* \* \*